United States Patent [19]

Huetter

[11] Patent Number: 4,546,509
[45] Date of Patent: Oct. 15, 1985

[54] MULTIPLE QUEEN BEEHIVE

[76] Inventor: Peter Huetter, 4780 Londonberry Dr., Santa Rosa, Calif. 95401

[21] Appl. No.: 490,524

[22] Filed: Jan. 23, 1984

[51] Int. Cl.⁴ .......................................... A01K 47/06
[52] U.S. Cl. ............................................. 6/1; 6/4 A
[58] Field of Search ........................ 6/1, 2 R, 4 A, 11

[56] References Cited

U.S. PATENT DOCUMENTS

| | | | |
|---|---|---|---|
| 32,769 | 7/1861 | Hartman | 6/2 R |
| 129,464 | 7/1872 | Cunningham | 6/2 R |
| 1,252,437 | 1/1918 | Hodgson | 6/1 |
| 1,552,139 | 9/1925 | Gibbs | 6/2 R |
| 1,803,813 | 5/1931 | Smith | 6/11 |
| 1,982,419 | 11/1934 | Chrysler | 6/4 A |

FOREIGN PATENT DOCUMENTS

| | | | |
|---|---|---|---|
| 51555 | 4/1936 | Denmark | 6/2 R |
| 900831 | 1/1982 | U.S.S.R. | 6/1 |

*Primary Examiner*—Robert P. Swiatek
*Attorney, Agent, or Firm*—Henry G. Kohlmann

[57] ABSTRACT

This invention relates generally to devices which are designed to facilitate the collection of honey and the cultivation of beehives. More specifically, it relates to a particular beehive construction which permits more than one colony of bees in the same beehive each with their own queen to collect and store honey in one or more common honey supers.

2 Claims, 7 Drawing Figures

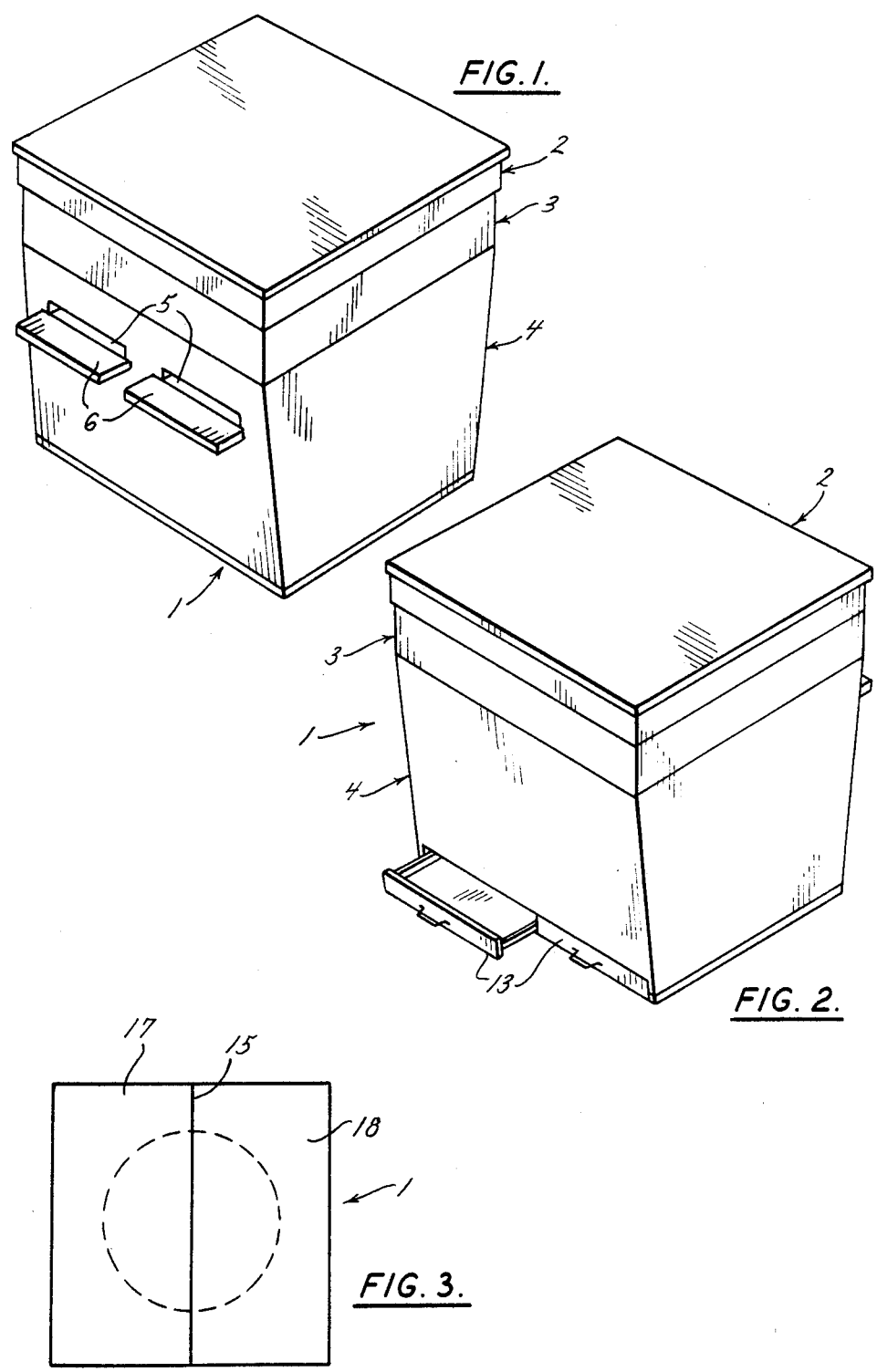

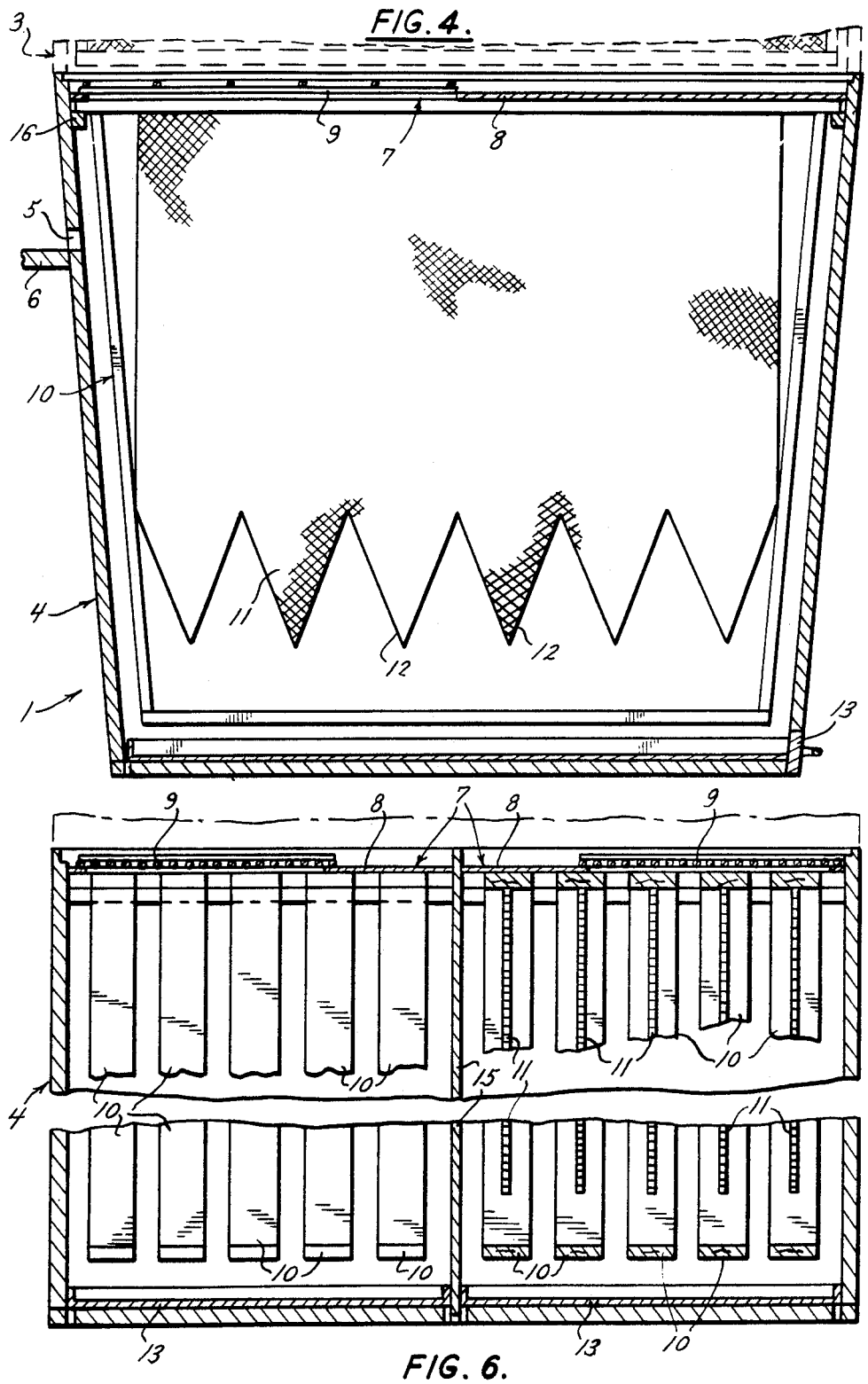

MULTIPLE QUEEN BEEHIVE

BACKGROUND OF THE INVENTION

1. Field of the Invention

This invention relates generally to devices designed to collect honey and cultivate the development of strong bee colonies and which permits the raising of multiple generations of bees thereby permitting the development of larger colonies of bees prior to the nectar flow season.

2. Prior Art

Centuries of beekeeping throughout the world have resulted in the development of beehives which allow beekeepers to avoid the annual destruction of colonies of bees in order to retrieve honey. The instant invention is derived out of sixty years of beekeeping in Europe and the United States by the inventor hereof. The concept of having two queens work in one hive is not new, it was described by the blind Swiss naturalist, Huber and Reverend Langstroth in the mid and late 1800's. However, cultivation of two queen hives in a standard hive structure is extremely difficult because of the necessity of stacking standard hive brood chambers some six or eight high and topping the same off with six to eight supers. This causes the twin hive to tip easily and in the event it should fall over it can cause severe injury to the bees as well as damage to the hive and associated equipment. In addition, the handling of filled honey supers stacked at the top of the hive becomes extremely difficult. The most serious disadvantage however, is the necessary continual modification of the hive structure and the resultant reduction of survival ability of the colony. When using the prior art beehives, one typically begins with a single queen colony and then divides the single colony with the introduction of a new queen and the gradual addition of more brood chambers to accommodate the expanding hive population. When the nectar flow ends and the hive is winterized it is returned to a single queen hive and a smaller bee population. The result of this two queen operation in a standard hive causes the large bee population to come in late around April and May of the year. In places with climates like California the large hive and the benefits of multiple queen hives are lost because the primary nectar flow occurs in early spring about mid-February and ends around the end of May. Accordingly, the large hive population collection capabilities is reached too late in the year to benefit fully from the peak nectar flow. In addition, the winter survival rate of the hive is severely decreased because the standard hive population does not benefit from a multiple colony warmth required for maximum survival as well as the reduction of honey consumption resulting therefrom.

Accordingly, it is an object of this invention to provide a beehive which permits multiple queen operation in a stable beehive structure.

It is a further object of this invention to provide a beehive which permits multiple independent bee colonies to benefit from the warmth of the other colonies within the same hive body thereby facilitating an early broodnest to take full advantage of early nectar flow as well as improving the winter survival of both colonies.

It is a further object of this invention to provide a brood chamber having slanted sides for easy removal of brood frames for inspection and cleaning.

It is a further object of this invention to provide a brood chamber with alighting boards and flight slots which permit dusting with terramyacin to prevent foulbrood disease without disassembling the beehive.

It is a further object of this invention to minimize swarm formation due to sufficient brood frame area.

It is a further object of this invention to provide brood frames which minimize bee injury and encourage drone cell building in generally the same area of each of said frames.

BRIEF DESCRIPTION OF THE DRAWINGS

FIG. 1 is an objective view of the front and side of the beehive showing the alighting boards.

FIG. 2 is an objective view of the back and side of the beehive showing the cleanout trays.

FIG. 3 is a top view of the hive body showing two inner chambers and the brood nest location and the heat conducting wall.

FIG. 4 is a side sectional view of the hive body showing the triangular comb structure in a brood frame.

FIG. 6 is a side view of the brood chamber filled with brood frames.

DESCRIPTION OF THE PREFERRED EMBODIMENT

Figure 5:
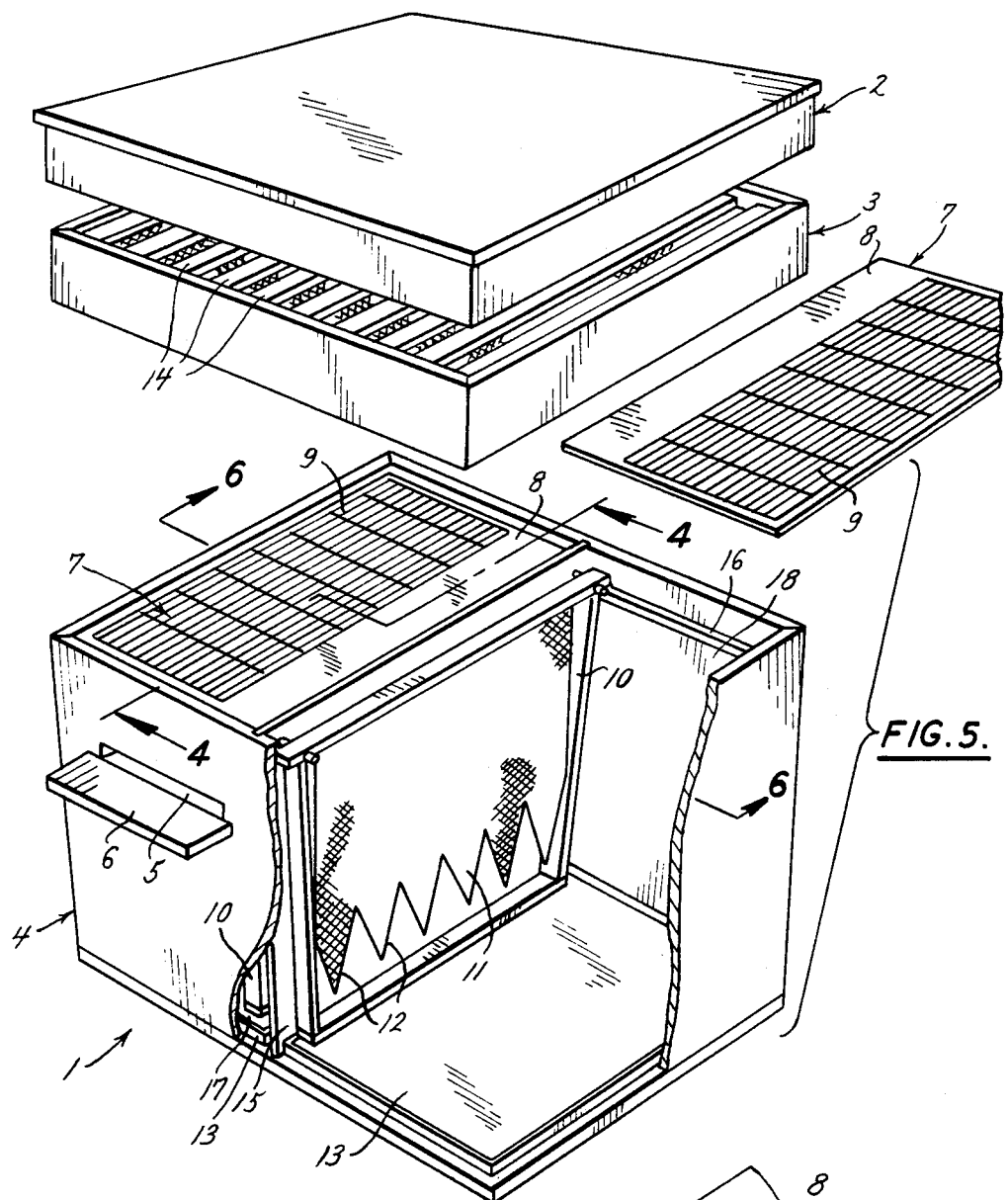
FIG. 5 is an exploaded sectional view of the beehive showing the top, honey supers, flight slots, queen exluders, brood chambers, brood frames, alighting boards, and cleanout trays.
Figure 7:
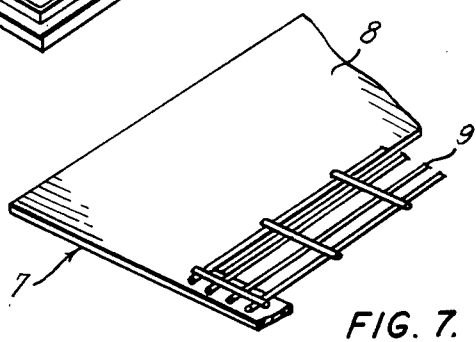
FIG. 7 is a partial view of the queen excluder and the flat plate on one side thereof.

With reference to the drawings, FIG. 5 is an exploded perspective view of the instant invention and comprises a twin beehive 1 having a top 2, a honey superchamber 3, housing a plurality of honey supers 14. It should be noted that a twin hive is proposed as the preferred embodiment but other multiples are possible and contemplated as part of this invention. Said hive further comprises a hive body 4 divided into at least two inner brood chambers 17 and 18 by a thin solid interior wall 15. For illustration purposes the right brood chamber 18 is shown containing only one brood frame although in practice six or more such frames may be inserted in each chamber. The front and rear of the hive body 4 and the broodchambers 17 and 18 are slanted inward at the bottom and the brood frames are constructed such that the sides thereof which are adjacent to the front and rear sides of the brood chamber are parallel to said walls and spaced apart therefrom and from the floor of the brood chamber a distance sufficient to prevent sealing with propolis by the bees but insufficient for comb building. The brood frame 10 is suspended at the top by a small protrusion on each end which makes contact with a small bar 16 mounted along the top of the front and rear of the brood chambers 17 and 18 and parallel with the floor of the brood chamber. This structure of the brood frame permits easy removal and insertion of the brood frames when loaded with bees and prevents injury to any bees which may stray onto the sides. In addition, the parallelogram construction of the brood frame parallel to the walls of the brood chamber causes the distance between the chamber and the frame to increase as the frame is withdrawn from the chamber thereby further minimizing contact with the walls of the chamber and any injury or dislodgement of the bees.

On the front of the brood chambers 17 and 18 are two alighting boards 6 and flight holes 5. These are placed near the top on the front of the brood chamber and permit dusting with terramyacin to prevent foulbrood disease. Such dusting may be easily and quickly accomplished through the flight slots many times per year without the necessity of disassembling the hive. Each brood chamber is also provided with diaper or cleanout trays 13 in the bottom thereof. These trays may be made of any suitable material and are removable through slots in the rear wall of the brood chamber when cleaning is required. In addition the floor of the brood chamber is provided with holes to permit the escape of any water which may enter the hive.

Each of the brood chambers 17 and 18 is covered with a queen excluder 7 having a flat metal plate 8 on the side near the center which aids in protecting the center of the hive during poor weather conditions and prevents queen to queen contact at the center of the hive. The remainder of the queen excluder is comprised of a plurality of wires or rods 9 which are spaced apart so that the general bee population may exit but are sufficiently close together to prevent the queen's abdomen from passing through. It should be noted that in standard hives where only one queen excluder is used to separate the two colonies, the queens can nevertheless meet at the boundary of the two hives and harm or kill one another. In the instant invention at least two such queen excluders are used and, therefore, the queens never meet. In addition, the common honey supers are not accessed by either queen and, therefore, remain clear of any eggs or larva.

It should be noted that the brood frame 10 not only has a unique shape but contains comb material 11 which has serrated edges 12 along the bottom. These serrations take the general form of triangular protrusions of two inches or so and do not make contact with the bottom of the brood frame. In addition, the tips of these triangular protrusions are also spaced apart from the bottom approximately two inches. While it is noted that Langstroth pointed out that bees will fill areas of greater width than 95 mm with wax and seal areas of less than 80 mm with propolis, it has been discovered that the particular comb structure of the instant invention encourages not only the filling of the space with wax as was predicted by Langstroth, but also encourages the building of drone cells by the bees and the laying of drone eggs in the lower region of the brood frame. This permits easy inspection of the brood frame for the location of the queen and general inspection of the comb for worker larva and provides a relatively consistent location of drone cells in relation to other cells within the hive. Standard hive bodies are generally of two kinds: a shallow body which is 16.8 cm (6⅝ inches). In addition, the standard honey supers also come in two sizes. The shallow super measures 12.22 cm (4 13/16 inches) in depth. Adherence to these standards results in the stacking of numerous hive bodies simply for single hive operation and a precarious number for two hive operation as was pointed out before. Failure to provide a large hive in which the queen can lay her eggs can result in swarming and loss of colonies due to over crowding. The instant invention provides substantial room for the laying of eggs due to large area brood frames which are 2 to 3 times the size of standard frames. With reference to FIGS. 1, 2 and 3 it is noted that the hive body 4 housing the brood frame 10 is 20 inches high and 24 inches square at the top and 24 inches by 19½ inches at the bottom. The angle formed by the front and rear walls of the hive body with the vertical is approximately 5 degrees. The brood frame 10 as shown in FIGS. 2 and 5 is 22¼ inches long at the top and 17¾ inches long at the bottom and bounded by 18 inch sides. The frame must be matched to the hive body in accordance with the Langstroth measurements as noted herein, so these dimensions may be adjusted depending on the thickness of the materials used for construction of the hive body. Mounted on the top of the hive body 4 is a honey super of approximately 6 inches in depth for holding standard deep honey supers. The entire structure is capped by a 4 inch deep top which should be large enough to fit completely over the honey super outside frame. This oversize brood frame 10 as described, substantially reduces swarming because the large area reduces the perception of over crowding and the queen does not feel threatened in her ability to find space to lay eggs.

FIG. 3 illustrates the manner in which the bee colonies on either side of the wall 15 form a ball in order to survive adverse weather conditions. Each colony population senses the warmth of the colony on the other side of the wall and, therefore, migrates to the wall; thus each benefits from the overall warmth of the whole. This result is not possible with the standard hive due to the vertical configuration of multiple colony hives. At the same time it must be noted that the wall 15 should not be an insulating wall. It must permit the free conduction of heat from one side to the other.

Finally, FIG. 4 shows the cleanout trays 13 from the rear of the hive body 4.

Having thus described the invention, what is claimed is:

1. A beehive comprising:
   a. a hive body in the form of a hollow box open at the top having a plurality of brood chambers capable of conducting heat between any two of said chambers adapted for holding a plurality of brood frames;
   b. a honey super frame mounted on top of said hive body adapted for holding a plurality of honey supers;
   c. means for preventing queen bees from one brood chamber from entering any other brood chamber comprising at least two rectangular members having a flat rectangular plate attached to one side of each of said members parallel to the plane of said member and adjacent to a plurality of openings sufficiently large to permit the passage of the general bee population through said openings but smaller than the abdomen of the queen bee, removably mounted over at least two brood chambers, each rectangular member having its rectangular plate adjacent to the rectangular plate of at least one other rectangular member at the top of said box; and
   d. at least one opening in said hive body adapted for allowing the passage of bees from outside of the hive body into at least one of said brood chambers.

2. A beehive as described in claim 1 wherein there are a plurality of rectangular members covering said box which are disposed over at least two brood chambers, each member having its rectangular plate adjacent to the rectangular plate of at least one other rectangular member.

* * * * *